United States Patent
Markuza et al.

(10) Patent No.: US 8,677,324 B2
(45) Date of Patent: Mar. 18, 2014

(54) EVALUATING PERFORMANCE OF AN APPLICATION USING EVENT-DRIVEN TRANSACTIONS

(75) Inventors: Dmitry Markuza, Yehud (IL); Dror Schwartz, Holon (IL); Moshe Eran Kraus, Mazkeret Batya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 499 days.

(21) Appl. No.: 13/017,522

(22) Filed: Jan. 31, 2011

(65) Prior Publication Data

US 2012/0198476 A1 Aug. 2, 2012

(51) Int. Cl.
*G06F 9/44* (2006.01)

(52) U.S. Cl.
USPC ........... 717/127; 717/124; 717/131; 717/126; 717/128; 719/318

(58) Field of Classification Search
None
See application file for complete search history.

(56) References Cited

U.S. PATENT DOCUMENTS

| | | | |
|---|---|---|---|
| 6,449,739 B1* | 9/2002 | Landan | 714/47.2 |
| 6,564,342 B2* | 5/2003 | Landan | 714/48 |
| 7,512,954 B2* | 3/2009 | Srivastava et al. | 719/318 |
| 8,108,513 B2* | 1/2012 | Kiciman et al. | 709/224 |
| 8,423,975 B1* | 4/2013 | Scallon | 717/135 |
| 8,468,502 B2* | 6/2013 | Lui et al. | 717/127 |
| 2005/0080584 A1 | 4/2005 | Bonilla | |
| 2005/0091640 A1* | 4/2005 | McCollum et al. | 717/117 |
| 2005/0132333 A1* | 6/2005 | Neumann et al. | 717/124 |
| 2006/0277313 A1* | 12/2006 | Richer et al. | 709/229 |
| 2007/0033273 A1* | 2/2007 | White et al. | 709/223 |
| 2007/0083645 A1* | 4/2007 | Roeck et al. | 709/224 |
| 2009/0070786 A1* | 3/2009 | Alves et al. | 719/318 |
| 2009/0248611 A1* | 10/2009 | Xu et al. | 707/1 |
| 2010/0229036 A1 | 9/2010 | Goyal et al. | |
| 2010/0251031 A1* | 9/2010 | Nieh et al. | 714/45 |
| 2011/0029821 A1* | 2/2011 | Chow et al. | 714/45 |
| 2011/0178788 A1* | 7/2011 | Liu et al. | 703/13 |
| 2011/0225569 A1* | 9/2011 | Beaty et al. | 717/127 |
| 2011/0283247 A1* | 11/2011 | Ho et al. | 716/107 |
| 2012/0054715 A1* | 3/2012 | Welchman et al. | 717/106 |
| 2012/0084437 A1* | 4/2012 | Wenig et al. | 709/224 |
| 2012/0331342 A1* | 12/2012 | Behrendt et al. | 714/23 |
| 2013/0145108 A1* | 6/2013 | Lindo et al. | 711/162 |

FOREIGN PATENT DOCUMENTS

CN 100370434 2/2008
WO 2009138123 A1 11/2009

OTHER PUBLICATIONS

Title: Performance evaluation of transaction processing coupling architectures for handling system dynamics, author: Yu, P.S.et al, source: IEEE, dated: 1994.*

Title: A benchmark for the performance evaluation of centralized and distributed transaction processing systems, author: Kohler et al, source: IEEE, dated: 1990.*

(Continued)

*Primary Examiner* — Chameli Das

(57) ABSTRACT

An event-driven performance measurement technique provides a set of transaction definitions that specify transaction actions that correspond to start and end points of a transaction. Events associated with execution of an application are received by a processor-based machine. The machine uses the events to generate transactions in accordance with the set of transaction definitions. The transactions can be used to evaluate performance of the application.

19 Claims, 3 Drawing Sheets

(56) References Cited

OTHER PUBLICATIONS

Sebastien Salva et al, "Automatic Ajax Application Testing," < http://ieeexplore.ieee.org/stamp/stamp.jsp?arnumber=5072524 >, May 24-28, 2009; on pp. 229-234.

Dr. James McCaffrey, "AJAX Test Automation," < http://msdn.microsoft.com/en-us/magazine/cc163479.aspx >, 2010.

Window Licker, < http://code.google.com/p/windowlicker/ >, downloaded Jan. 28, 2011.

Sjax: AJAX Option for Automated In-Browser Testing, < http://ajaxian.com/archives/sjax-ajax-option-for-automated-in-browser-testing >, Jan. 26, 2007.

HP TruClient Technology: Accelerating The Path To Testing Modern Applications, Business White Paper, Nov. 2010, 8 pages.

HP Load Runner, "Ajax TruClient Tips & Tricks," Oct. 2010, 22 pages.

HP Load Runner Software, Data Sheet, Jan. 2011, 4 pages.

HP Load Runner Software, What's New, Oct. 2010, 2 pages.

* cited by examiner

EVALUATING PERFORMANCE OF AN APPLICATION USING EVENT-DRIVEN TRANSACTIONS

BACKGROUND

Many of today's applications allow for dynamic, asynchronous data transfer, using multiple communication protocols and a variety of servers. Often, such applications gather data from distributed, heterogeneous sources. Clients having client-side functionality often also have server-side components, which may need additional processing before the server sends the data back to the client over a network. This separation of components over the network can cause latency that may affect the overall performance of an application that is executing on the network. Understanding the elements which contribute to this latency is important for developing and maintaining applications that must meet certain performance requirements.

In addition to performance issues caused by network latency, many application developers are now using new application technologies (such as Web 2.0 technologies) having features that enhance the interactivity of the user experience but at the cost of increasing network traffic. When compounded with network latency and bandwidth constraints, the large amounts of network traffic generated by these new technologies can create bottlenecks that can significantly impact system performance.

To accurately predict the performance of an application, the individual components of the application may be tested both during development and in a production environment. Generally, performance testing solutions create synthetic transactions involving virtual users (Vusers) on an emulated network in order to predict application performance in production.

BRIEF DESCRIPTION OF THE DRAWINGS

Some embodiments are described with respect to the following figures.

DETAILED DESCRIPTION

Figure 1:
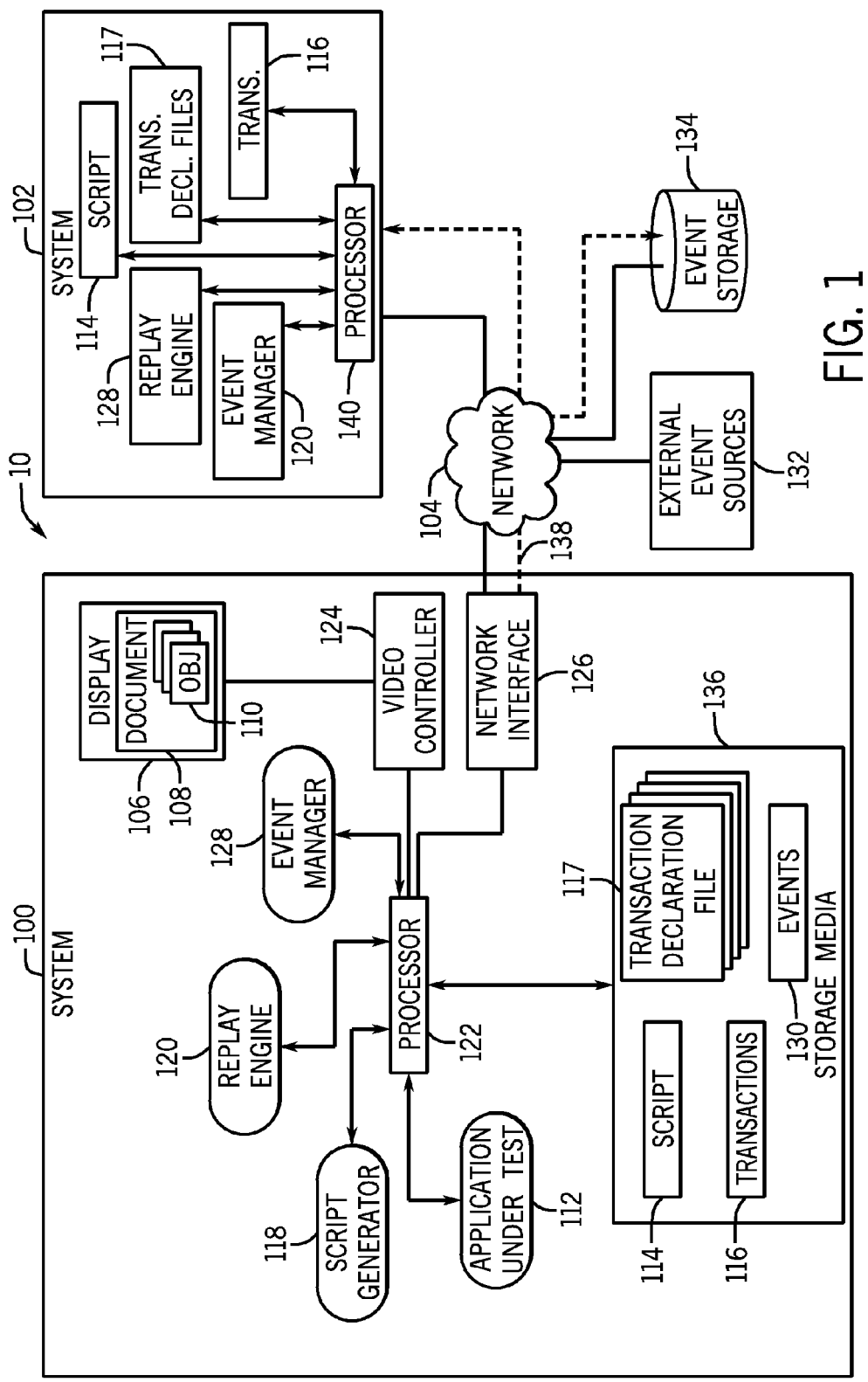
FIG. 1 is a block diagram of a system in which an exemplary event-driven technique for generating transactions for performance measurements may be implemented in accordance with various embodiments.

Testing modern applications, such as Web 2.0 applications, can present unique challenges. The complexity of new application technologies, the asynchronous nature of communications, the lack of commonly recognized and accepted standards for developing applications, and the sheer multitude of emerging frameworks and developer toolkits make it difficult for developers to build testing strategies and select appropriate automated performance testing and monitoring solutions. Automated testing tools (e.g., which may be used to simulate loads on a server, perform function testing to identify faults in the system, test security features of the system, test performance of the application in a particular environment, etc.) typically employ scripts that have been created based on previous observations of a user's interaction with the web application. Such tools generally operate by monitoring a user's interactions with the objects in a web application and generating an automation script that contains actions that are representative of those interactions (i.e., script recording time). Then, at a later time, multiple instances of the automation script may be replayed (or executed) for purposes of testing the application (i.e., script replay time).

In the past, automated performance testing solutions have employed a transaction model that requires encoding the script in a manner that allows for measuring the performance of an application. In general, performance testing entails measuring the time it takes for a particular transaction in the application to complete. Past measurements of performance have been implemented by inserting transaction start and end points in hard-coded locations in the script, which generally correspond to the starting and ending steps of actions that have been recorded in the script. However, if a start or end point of a transaction is dependent on an external source (i.e., a source outside of the script), then the transaction cannot be measured using the script in this manner. As an example, in Internet environments which provide for asynchronous communications, a response from the server can return at any point during the test of the application by means of a callback. Because the callback is outside of the scope of the script (i.e., it does not correspond to an action contained within the script), an endpoint that corresponds to receipt of the response cannot be defined in the script itself.

Another problem with known performance testing tools that are dependent on a script arise because the script generally reflects actions at a high level (e.g., above the transport layer, such as at the user interface (UI) level). As a result, there often may be a mismatch between the building blocks of the script and the entities that are actually of interest since the entities-of-interest often are at a level below the UI. For example, a UI step of clicking on a link can trigger multiple network requests, each of which may need to be separately measured in order to evaluate performance issues. Again, because the script is representative of actions at the UI level, transaction end points that can be used to measure performance of these lower level entities cannot be hard coded into the script.

Accordingly, embodiments of the invention are directed toward enabling performance measurements in complex applications, such as Web 2.0 applications, in a manner that is not tied to any script that is used to test the application. More particularly, embodiments of the invention implement techniques for measuring performance of an application on a system in a manner that is not directly initiated by the script. In accordance with these techniques, different parts or components of the system can dispatch events (either synchronously or asynchronously) that can, in turn, be transformed into transactions based on a set of predefined rules. These rules can define transactions in an event-driven declarative manner that is agnostic to the specific script and/or the specific business process that is being implemented.

FIG. 1 illustrates an exemplary arrangement of a computing system 10 in which embodiments of the performance measurement technique can be implemented. Referring to FIG. 1, as a non-limiting example, the arrangement 10 includes a system 100 and a system 102 connected over a network 104. In other embodiments, only system 100 may be included and system 102 may be omitted. Alternatively, system 100 may be connected to additional systems 102 or other systems over the network 104. Examples of the network 104 include a local area network, a wide area network, the Internet, or any other type of communications link, and combinations thereof. Examples of the system 100 and 102 include computers (e.g., desktop computers, notebook computers, servers) or other electronic devices, such as personal digital assistants, electronic appliances, and so forth. It should be understood that the location or proximity of system 102 relative to system 100 is not limited in any particular manner and that the systems 100 and 102 may be geographically remote or located in the same room or building, for instance.

The system 100 includes a display device 106 for presenting to the user information 108 (e.g., a document, such as a web page) and its objects 110 that are associated with execution of an application, such as an application under test 112. The system 100 may also include various input devices (not shown) for providing information to the system 100, such as a keyboard, pointing device, touchscreen, and so forth. In an exemplary implementation, the system 100 contains machine executable program instructions and hardware that executes these instructions for the purpose of generating an automation script 114 based on observations of user interactions with objects 110 included in the documents 108 associated with the application 112 and displayed on the device 106. The objects 110 may include any of a variety of structures that include modifiable data and/or programming that operates on the data. The data may describe, for example, a displayable element of the web page 108 (e.g., color, size, border, text, display location, etc.) wherein the displayable element is modifiable or capable of performing an operation in accordance with user input.

The system 100 also includes instructions and hardware that executes these instructions for the purpose of generating transactions 116 that may be used to measure and evaluate performance aspects of the application 112. In accordance with embodiments of the techniques described herein, and as will be explained in further detail below, transactions 116 are generated by mapping events dispatched from various event sources to transaction actions that are specified in a set of transaction declaration files 117. These generated transactions 116 can be analyzed for the purpose of evaluating and/or measuring performance of the application 112 when executed in a particular computing environment.

In a specific example, the system 100 includes an automation script generator 118 to generate the automation script 114 by recording a series of actions that occur when a user interacts with the objects 110 associated with the application 112. The system 100 also includes a replay engine 120 to replay the script 114 to emulate one or more users' interactions with the application 112 and, thus, to test various aspects of the application 112, such as the performance of the application 112 in the emulated or production environment under particular load conditions. The automation script generator 118 and replay engine 120 are executable on a processor (or multiple processors) 122. The processor(s) 122 is (are) connected to a video controller 124 and a network interface 126. The video controller 124 is coupled to the display device 106 for presenting images on the device 106. The network interface 126 allows the system 100 to communicate over the network 104.

The system 100 further includes an event manager 128 that manipulates events 130 that are dispatched to the event manager 128 from various event sources that are present in the computing system 10. Event sources can include sources 132 that are external to the system 100 and, thus, dispatch the events 130 to the event manager 128 over the network 104. Event sources also can be internal to the system 100. For instance, the replay engine 120 and the script 114 can be the sources of dispatched events 130. Still further, the event source can be a storage device 134 in which events 130 that have been dispatched are stored. Such implementations may be particularly useful for generating and analyzing transactions 116 offline (e.g., after an automated testing tool has completed execution). The generation of transactions 116 by the event manager 128 will be explained in further detail below.

With reference still to FIG. 1, system 100 also includes computer-readable storage media 136 for storing various programs, data, etc. In the exemplary system 100 shown in FIG. 1, the automation script 114, along with transaction declaration files 117 and generated transactions 116, can be stored in the storage media 126. In some embodiments, received events 130 also may be stored in the storage media 126. Alternatively (or additionally), the events 130 may be persisted by the event manager 128 to a separate data storage device 134. The storage device 134 can be local to the system 100 or, as shown in FIG. 1, the device 134 can be remote to the system 100 and accessible via the network 104 (see arrow 138).

The replay engine 120 replays the automation script 114 at a later time to emulate user interactions with the application 112. The automation script 114, replay engine 120, and event manager 128 can be executed in the system 100, or alternatively, the automation script 114, replay engine 120, and/or event manager 128 can be included in installation file(s) that are communicated (see arrow 138) over the network 104 for installation on the system 102 for execution on one or multiple processors 140 of the system 102. In such embodiments, transactions 116 can be generated by and maintained in the system 102. In other embodiments, the script 114, replay engine 120, and/or event manager 128 can be installed for execution on the system 102 from installation file(s) stored on a portable storage medium (e.g., an optical disc).

In some examples, the system 100 can be a client device at which users can make various selections or command actions that are captured by the automation script generator 118 of the client device during a recording session. The automation script generator 118 of each client device can then produce the automation script 114 that is sent to a different system, such as system 102, for execution. For example, the system 102 may be a test system designed to perform testing of an application-under-test using the automation script 114 and replay engine 120.

In alternative implementations, the system 100 is a server system that is connected to multiple client devices. User actions made at the client devices can be captured by the automation script generator 118 in the server system 100. In such implementations, the automation script 114 that is generated by the server system 100 does not have to be communicated to a different system for execution. Instead, the automation script 114 can be executed on the system 100 itself. Regardless of which server executes the script 114, the transactions 116 generated by the event manager 128 based on the events dispatched during replay time can then be analyzed to evaluate the performance of the application-under-test (e.g., application 112).

As mentioned above, the automation script 114 is generated at a record time. More particularly, during a recording session, operations affecting the document 108 are detected and recorded into the automation script 114. Operations may include user actions on an object 110 (e.g., a mouse over, a mouse click or other selection of the object, movement of a slider bar, etc.); user actions on an object 110 that affect another object 110 (e.g., a selection of a list item which changes a listbox value); a detectable change of an attribute of the object 110 (e.g., color, size, location, etc.); and so forth. During script replay, the recorded actions are replayed in order to emulate users' interactions with the application in an emulated or actual computing environment. The script replay thus may be used to evaluate various aspects of the application, such as load testing (in which multiple virtual users interact with the application), securing testing, performance testing, etc.

Figure 2:
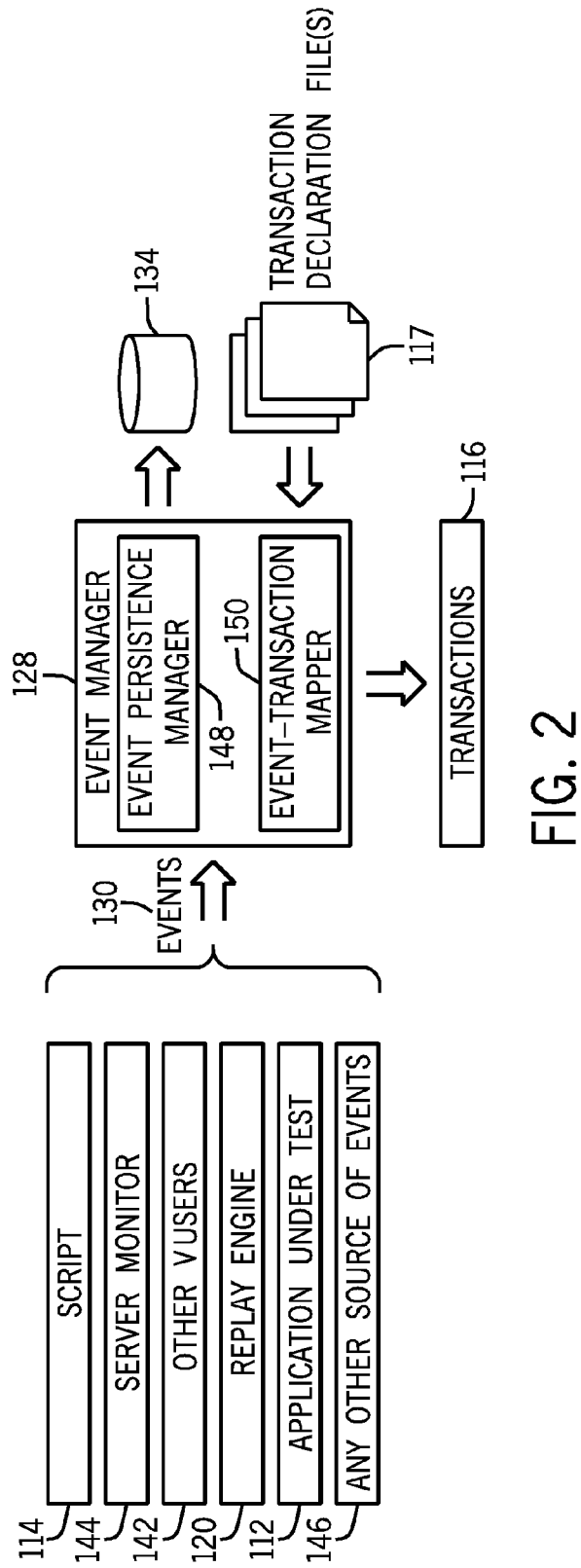
FIG. 2 is a diagram of exemplary components in the system of FIG. 1 for generating online event-driven transactions, in accordance with various embodiments.

In the specific embodiment illustrated in FIG. 1 and with reference to FIG. 2, during script replay, events 130 are dispatched from various sources (e.g., external event sources 132, script 114, replay engine 120, etc.) to the event manager 128. In some implementations, each event 130 includes a name and optionally some payload data (e.g., start-time for asynchronous events). An event source can be any source that generates an event 130. Examples of event sources include the script 114 itself (e.g., a function call from within the script); application-under-test monitors 112 on the client side; the script replay engine 120 (e.g., which dispatches an event each time a socket opens, a request is sent, a host name is resolved using a DNS, etc.); other virtual users 142 (e.g., a user that wishes to measure the time it takes for another user to perform an action, e.g., "how long since Vuser A writes on the wall of Vuser B until Vuser B sees the message"); server side monitors 144; or any other source 146 that dispatches an event 130 that is associated with execution of the application-under-test.

In the exemplary implementation of FIGS. 1 and 2, the event manager 128 includes an event persistence manager 148 and an event-transaction mapper 150. In operation, the event manager 128 is initialized with a set of transaction declaration files 117 that are decoupled from the script 114 and that define transactions as entities that are separate from the script 114. In an exemplary implementation, each declaration file 117 includes a transaction name/type; a transaction action (e.g., start/end/status change/etc.); and one or more event identifiers. An example of a transaction declaration file is provided below in XML format:

```
<transactions>
    <transaction name="Transaction 1">
        <rule name="start">
            <event name="login">
            <event name="Action started">
        </rule>
        <rule name="end">
            <event name="Logout">
        </rule>
    </transaction>
<transactions>
```

The foregoing declaration file defines a transaction that is named "Transaction 1". Rules are provided to specify actions that correspond to the start and end points of the transaction. In this example, the transaction starts either when a (virtual) user logs in to an application or initiates an action with the application. The transaction ends when the (virtual) user logs out of the application.

Although the foregoing example has been provided in XML format, it should be understood that other formats may be used to define the transactions as may be appropriate for the particular environment and application in which the performance testing techniques described herein are implemented. Moreover, the transaction declaration files can include different and/or additional rules that reflect different actions that may be taken in the particular application (e.g., start actions, stop actions, status changes, etc.), and can include different and/or additional identifiers for the various actions and events.

Referring again to FIG. 2, the event-transaction mapper 150 maps the received events 130 to the transaction actions (e.g., start/end/status change/etc.) that are specified in the transaction declaration files 117. The event persistence manager 148 can optionally persist the raw dispatched events 130 to the event storage device 134.

Figure 3:
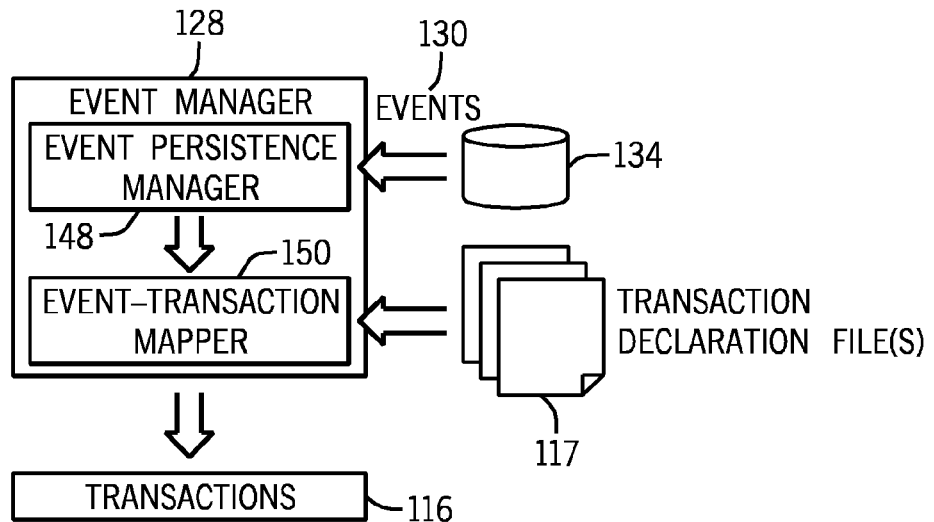
FIG. 3 is a diagram of exemplary components in the system of FIG. 1 for generating offline event-driven transactions, in accordance with various embodiments.

In embodiments of the invention, a set of transaction declaration files 117 may be predefined and then used to generate transactions 116, such as when the script 114 is replayed. Alternatively, the raw events 130 that have been persisted into the event storage device 134 may be accessed at a later time to generate offline transactions 116. In such implementations, and with reference to FIG. 3, the event manager 128 is initialized with the set of transaction declaration files 117. The event persistence manager 148 may then read the events 130 from the event storage device 134 for dispatch to the event-transaction mapper 150. The event-transaction mapper 150 maps the events 130 to transaction actions according to the set of transaction declaration files 117 to generate transactions 116 in an offline manner. In this way, the offline transactions 116 can be used to further analyze performance of the application 112 and, in some instances, can shed light on problems with performance without the need to replay the script 114 to repeat the actual load testing.

In some instances, analysis of the offline transactions 116 can lead to modification or creation of new transaction declaration files 117 that may be useful for gaining a more thorough understanding of the performance of the application 112. In such instances, the modified and/or new files 117 can then be used to create additional/new transactions 116 without replaying the script 114.

Once created, the transaction declaration files 117 can be grouped into libraries, which can then be available for use with multiple different scripts. For instance, the event manager 128 may be initialized with the transaction declaration files 117 contained in the library when the replay engine 120 is preparing to replay a first script. The event manager 128 may also be initialized with the of transaction declaration files 117 from the same library when the replay engine 120 is preparing to replay a second script that represents either different user interactions with the same application 112 or user interactions with a different application. In addition, for well-known computing environments, the transaction libraries can be predefined and provided as part of the application product. Alternatively, the transaction libraries may be custom made by the user to meet the particular needs and idiosyncrasies of a particular application or application environment.

Defining transactions 116 in an event-driven manner provides a great deal of flexibility over current performance measurement techniques which require transactions to be hard-coded into the automation script 114. Because the transactions 116 that are generated using the event-driven techniques described herein are independent of the script 114 (i.e., are not encoded into the script 114 or tied to or initiated by the high level actions contained within the script 114), transactions can be successfully defined for asynchronous applications. In addition, granularity in performance testing can be improved because transaction definitions are not limited to the high level steps (i.e., UI actions) that are contained within the script 114. Instead, events 130 that occur at lower levels (e.g., the transport layer) may be captured by a transaction definition 117 and used to analyze performance. In addition, prior techniques were limited in that start and end points had to be hard-coded into the script 114 at locations that occurred before and after the high level actions recorded by the script. By defining transactions outside of the script 114, a transaction 116 can be defined that occurs entirely within a script step or which terminates before the step itself ends. In addition, transaction definitions 117 can be cascaded (e.g., multi-level transactions), which can provide even more flexibility for evaluating performance of an application. Consequently, performance measurements can be far more accurate because they are not limited to atomic actions. Yet further, defining transactions separately and independently from the script 114 simplifies both the creation and maintenance of the transaction definitions 117. Also, any changes to transaction definitions 117 or the creation of new definitions 117 will not require rewriting the script 114, which can be a time-consuming and expensive process. Still further, both modification and creation of transaction declaration files 117 may be performed offline, such as after the performance testing has been completed and either during or after the results of the testing have been analyzed, which provides even more flexibility in gaining an understanding of performance issues.

Figure 4:
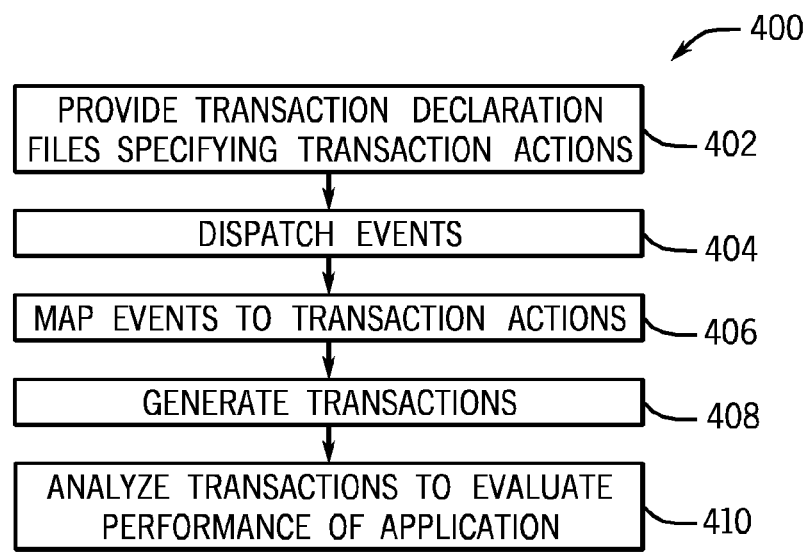
FIG. 4 is a flow diagram of an exemplary technique for generating event-driven transactions for measuring performance of an application, in accordance with various embodiments.

An exemplary embodiment of a performance measurement technique 400 using event-driven transaction definitions that may be implemented in the arrangement 10 is shown in FIG. 4. At block 402, a set of transaction declaration files containing rules for defining transactions are provided. Events associated with execution of an application-under-test are dispatched to the event manager (block 404). Dispatching of events may either occur online (i.e., while the application is being tested, such as by replaying the script) or offline (i.e., the events are dispatched from the event storage device 134 after the script 114 has been replayed). The dispatched events are then mapped to the transaction actions specified in the transaction definitions 117 (block 406), and transactions are generated accordingly (block 408). The transactions may then be stored and analyzed to evaluate and/or measure the performance of the application-under-test (block 410). In some embodiments, analysis of the transactions can also result in creating new transaction definitions or modifying existing transaction definitions. In such implementations, if the raw events have been persisted to storage, new transactions can be generated using the new or modified transaction definitions without replaying the script.

It should be understood that the flow diagram of FIG. 4 has been provided as an illustrative example only and that the transaction generation and performance measurement technique may include fewer, additional, and/or different steps than those shown in FIG. 4. In yet other embodiments, at least some of the steps shown in FIG. 4 can be performed in different orders and/or in parallel and that various steps may be performed online, offline, or both online and offline.

Instructions of software described above (including the technique of FIG. 4 and the instructions included in the modules 112, 118, 120 and 128 of FIGS. 1-3) are loaded for execution on a processor (such as one or multiple processors 122, 140 in FIG. 1). A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs).

Data and instructions are stored in respective storage devices (such as, but not limited to, storage media 136 and storage device 134 in FIG. 1) which are implemented as one or more non-transitory computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. The instructions also may be provided on the storage media in the form of installation file(s) that can be downloaded to a computing system either over a network or from a portable storage medium, such as an optical disk. Such computer-readable or machine-readable storage medium or media is (are) considered to be part of an article (or article of manufacture). An article (or article of manufacture) can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
recording into a script a plurality of script actions representative of a user's interactions with an application;
replaying the script of recorded actions;
receiving, by a processor-based machine, events that occur as a result of execution of the application, wherein the received events are dispatched by event sources during the replaying of the script; and
using the received events to generate, by the processor-based machine, transactions for evaluating performance of the application when executed, wherein the transactions are generated in accordance with a set of transaction definitions,
wherein each transaction definition in the set specifies actions which correspond to a start point and an end point of a transaction associated with execution of the application, and wherein the transaction definitions are provided separately from the script.

2. The method as recited in claim 1, wherein the events dispatched by the event sources are stored in a storage device, and wherein the events are dispatched from the storage device and the transactions are generated after the replaying of the script.

3. The method as recited in claim 1, wherein the action specified by a transaction definition as corresponding to the transaction start point is not directly initiated by any script action recorded into the script.

4. The method as recited in claim 1, wherein at least some of the actions specified by the transaction definitions do not directly correspond to any actions recorded in the script.

5. The method as recited in claim 1, further comprising:
modifying the set of transaction definitions; and
using the received events to generate new transactions in accordance with the modified set of transaction definitions.

6. The method as recited in claim 5, wherein the new transactions are generated without replaying the script.

7. The method as recited in claim 1, further comprising:
evaluating the transactions to assess the performance of the executed application.

8. A performance measurement system, comprising:
a memory to store a set of transaction declaration files, wherein each of the transaction declaration files defines a transaction including specifying transaction actions that correspond to a start point and an end point of the transaction, the start point and the end point being defined by rules in the respective transaction declaration file;
a processor to execute an event manager module to receive events associated with execution of an application in a computing system and to generate transactions by mapping the received events to the specified transaction actions, wherein the transactions provide a measurement of a performance of the application; and
an automation script stored in the memory, wherein the automation script contains script actions representative of recorded user interactions with the application, and wherein the set of transaction declaration files are stored in the memory separately from the script.

9. The system as recited in claim 8, wherein at least one of the transaction declaration files specifies a transaction action for a start point that is not directly initiated by any script action contained in the automation script.

10. The system as recited in claim 8, wherein at least one of the transaction declaration files specifies a transaction action that does not directly correspond to any script action contained in the automation script.

11. The system as recited in claim 8, wherein the processor is to execute the automation script to test performance of the application, and wherein at least some of the received events are dispatched by an event source other than the automation script, and at least another of the received events corresponds to an output of the automation script.

12. The system as recited in claim 11, further comprising a storage device to store the received events that are accessible by the event manager module for generation of the transactions.

13. The system as recited in claim 12, wherein the set of transaction declaration files is modified after the automation script is executed, and wherein the event manager module uses the stored events to generate transactions in accordance with the modified set of transaction declaration files without re-executing the automation script.

14. An article comprising a non-transitory computer readable storage medium to store instructions that when executed by a computer cause the computer to:
execute an automation script, wherein the automation script contains script actions representative of a user's interactions with an application on a computing system;
receive events dispatched as a result of the execution of the automation script; and
generate transactions associated with execution of the application in accordance with a plurality of transaction definitions, wherein the transaction definitions are not contained within the automation script,
wherein each of the transaction definitions specifies transaction actions that correspond to a start point and an end point of the corresponding transaction, the start point and the end point specified by rules in the respective transaction definition, and wherein the transactions are generated by mapping the received events to the specified transaction actions.

15. The article as recited in claim 14, wherein the instructions further cause the computer to persist the received events to a storage device, and wherein the transactions are generated by mapping the stored received events to the specified transaction actions after the automation script has been executed.

16. The article as recited in claim 14, wherein at least one of the transaction definitions specifies a transaction action that corresponds to a start point that is not directly initiated by any script action contained in the automation script.

17. The method of claim 1, wherein receiving the events comprises:
receiving at least one event from an external source that is separate from the script; and
receiving at least one event from execution of the script.

18. The article of claim 14, wherein receiving the events comprises:
receiving at least one event from an external source that is separate from the automation script; and
receiving at least one event from execution of the automation script.

19. The method as recited in claim 1, wherein generating the transactions comprises mapping the received events to the actions specified by the transaction definitions.

* * * * *